United States Patent [19]

Miller

[11] Patent Number: 4,731,930

[45] Date of Patent: Mar. 22, 1988

[54] ENCLOSED MEASURING DEVICE

[75] Inventor: Walter Miller, Traunstein, Fed. Rep. of Germany

[73] Assignee: Dr. Johannes Hiedenhain GmbH, Fed. Rep. of Germany

[21] Appl. No.: 68,666

[22] Filed: Jul. 1, 1987

[30] Foreign Application Priority Data

Jul. 11, 1986 [DE] Fed. Rep. of Germany ....... 3623353

[51] Int. Cl.⁴ .............................................. G01B 11/02
[52] U.S. Cl. ............................ 33/125 R; 277/DIG. 7; 277/DIG. 4; 277/237 R
[58] Field of Search ............. 33/125 R, 125 A, 125 B, 33/125 C; 277/DIG. 4, DIG. 7, 53, 55, 237 R, 237 A, 12, 56, 57

[56] References Cited

FOREIGN PATENT DOCUMENTS 2846768 4/1980 Fed. Rep. of Germany .
8110274 12/1982 Fed. Rep. of Germany .
3409514 5/1985 Fed. Rep. of Germany .
2142693 4/1985 United Kingdom ......... 277/DIG. 7

Primary Examiner—Harry N. Haroian
Attorney, Agent, or Firm—Toren, McGeady & Associates

[57] ABSTRACT

An enclosed measuring device for measuring the relative position of two objects which are movable relative to each other includes a housing provided with a longitudinal slot. The slot is closed by means of cover members mounted in a chamber of the housing. The cover members are comb-shaped in transverse cross-section and are arranged so as to mesh with each other, resulting in a labyrinth-type line of contact between the cover members. A carrying member providing the connection between the interior of the housing and one of the objects has a meander-like shape conforming to the labyrinth-type line of contact between the two cover members, so that an effective sealing action is ensured even at the location where the carrying member extends through the cover members.

5 Claims, 2 Drawing Figures

ENCLOSED MEASURING DEVICE

BACKGROUND OF THE INVENTION

1. Field of the Invention

The present invention relates generally to an enclosed measuring device. The invention relates particularly to a device for measuring the relative position of two objects which are movable relative to each other, particularly for the measurement of lengths or angles. The device includes a housing connected to one of the objects. The housing defines at least one slot extending in the direction of movement of the two object relative to each other. A pair of flexible cover members attached to the housing so as to cover the slot extend in the direction of the slot. The two cover members contact each other and are shaped in such a way that a labyrinth-type line of contact is formed between the two cover members. A carrier member attached to the other one of the objects extends through the slot and between the two cover members. The carrier member is shaped to conform to the line of contact between the two cover members. A structural unit serving for carrying out the measurement is attached to the end of the carrier member.

2. Description of the Prior Art

In enclosed measuring devices of the above-described type, it is necessary to provide a longitudinal slot in the housing through which the carrier member can extend into the interior of the housing, so that the structural unit used for scanning the scale located within the housing can be connected to a mounting base provided outside of the housing. For example, in the case of a machine with bed and sliding carriage, the relative movement of the bed and the sliding carriage is transmitted to the scale or the structural scanning unit and the carrier member is moved within the slot in the direction of the relative movement and the movement can thus be measured.

In order to provide protection for the highly sensitive scale, the slot formed in the housing must be closed as effectively as possible. A passage toward the interior of the housing should be made available only in the area of the carrying member.

A measuring device of the above-described type is disclosed in German Pat. No. 28 46 768. In this measuring device, a scale and a scanning unit are mounted in a hollow member which is provided with a continuous slot in measuring direction. This slot is closed by means of sealing elements arranged in a roof-like manner, the sealing elements being formed by lips of plastics material or rubber. A carrying member extends through the sealing elements in order to connect the scanning unit to an object to be measured.

Moreover, German Pat. No. 34 09 514 discloses an enclosed measuring device in which an especially effective protection against sprayed media is obtained by sealing elements which have a labyrinth-type shape in transverse cross-section. The shape of the carrying member conforms to the labyrinth-type shape of the sealing elements, so that the sealing effect is maintained even where the carrying member extends through the sealing elements.

It is the object of the present invention to further improve the sealing members used for sealing the longitudinal slot of the housing of the measuring device described above.

SUMMARY OF THE INVENTION

In accordance with the present invention, the cover members are comb-shaped in transverse cross-section and the cover members are in meshed contact with each other, whereby the labyrinth-type line of contact between the cover members is obtained. The carrying member extends through the cover members transversely of the direction of relative movement between the two objects, the carrying member having a meander-like transverse cross-section conforming to the labyrinth-type line of contact between the cover members.

The comb-like cover members according to the present invention which are in meshed contact with each other provide an effective seal of the gap of the housing and prevent foreign bodies or liquids as well as spray mists or the like from penetrating into the interior of the measuring device. The effective sealing action is ensured even where the carrying member extends through the cover member.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
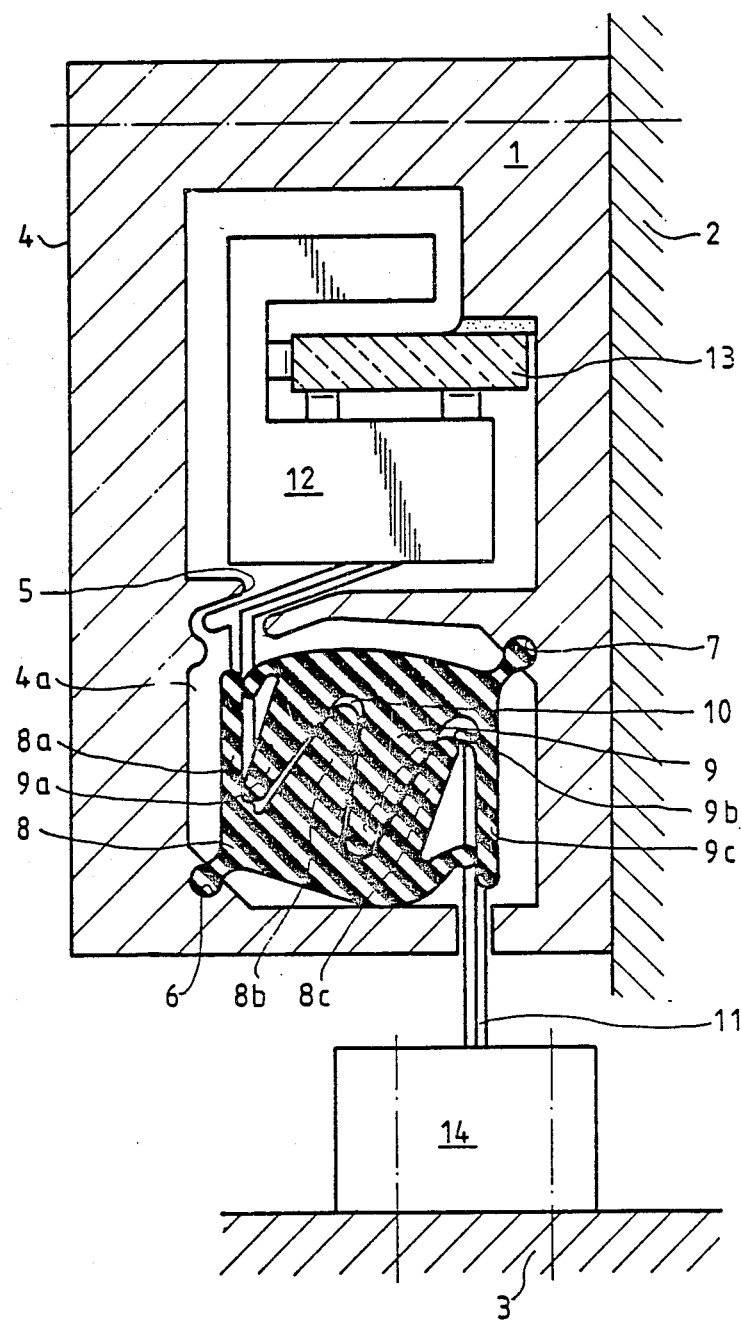
FIG. 1 is a schematic cross-sectional view of an enclosed measuring device according to the invention for measuring lengths.

As illustrated in the cross-sectional view of FIG. 1, the measuring device 1 according to the invention includes a housing 4 attached to a sliding carriage 2 of a machine tool, not shown in detail. Sliding carriage 2 is guided relative to a bed 3 of the machine tool in the known manner, not illustrated. The housing 4 is formed by a hollow section which is closed at its end faces. A continuous slot 5 is formed in longitudinal direction of housing 4.

Slot 5 opens into a chamber 4a which is part of housing 4.

Two recesses 6 and 7 are formed in chamber 4a. These two recesses 6 and 7 are located opposite each other and extend parallel to slot 5. Cover members 8 and 9 extending over the entire length of the measuring device are inserted into recesses 6 and 7, respectively.

The cover members 8 and 9 are of a material having a great natural elasticity. The shape and the assembly of the cover members 8 and 9 are such that the free ends of the cover members 8 and 9 mesh with each other. The cover members 8 and 9 are comb-shaped in transverse cross-section, so that a labyrinth-type line of contact 10 is formed between the two cover members 8 and 9. In addition to the sealing effect obtained by the contact between the cover members 8 and 9, the labyrinth-type line of contact 10 and the chamber 4a further prevent the penetration of harmful media into the interior of the measuring device 1.

Figure 2:
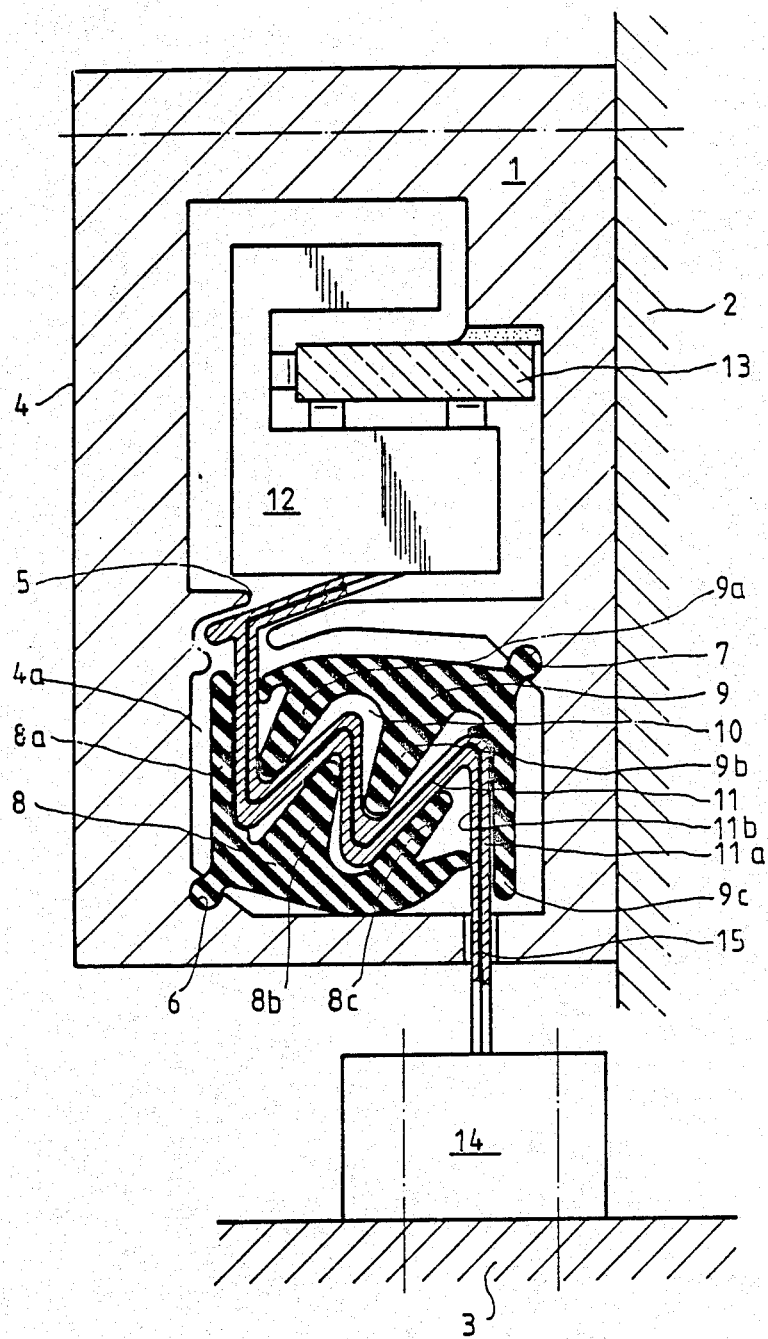
FIG. 2 is a schematic cross-sectional view of the measuring device of FIG. 1, taken in the plane of the carrying member.

FIG. 2 of the drawing shows the same measuring device, with the section taken at a different location from FIG. 1. At this location, a carrying member 11 extends between the cover members 8 and 9 along the labyrinth-type line of contact 10. Thus, the carrying member 11 has a meander-like shape conforming to the comb-like shape of the cover members 8 and 9.

In the interior of the measuring device 1, a scanning head 12 is connected to carrying member 11. Scanning head 12 scans a scale, not shown, of a measuring rod 13 which is also arranged in the interior of the measuring device 1. Measuring rod 13 and scanning head 12 are sensitive optical or electronic components which are to be protected against harmful outside influences by housing 4.

Scanning head 12 is connected via carrying member 11 to an assembly base 14 which is attached to a bed 3 of the machine.

When the components of the machine change their relative position, i.e., when sliding carriage 2 of the machine is moved relative to machine bed 3, housing 4 changes its position in the same manner and measuring rod 13 moves along scanning head 12. Thus, scanning head 12 scans the scale of measuring rod 13 and provides a measure for the distance travelled by the sliding carriage 2 which can be numerically displayed in the known manner. It is possible to make bores in the meander-like cross-sectional direction of the carrying member 11 for accommodating electrical lines. On the other hand, the carrying member 11 can also be manufactured in two shells or two pieces, as described in German Utility Model No. 81 10 274. Electrical connections can be particularly advantageously effected in a carrying member 11 having two shells by means of known flexible printed circuits 15. After the flexible printed circuit 15 has been placed between the two halves 11a and 11b of the carrying member 11, these two halves can be connected to each other by means of gluing, ultrasound welding or the like.

While a specific embodiment of the invention has been shown and described in detail to illustrate the application of the inventive principles, it will be understood that the invention may be embodied otherwise without departing from such principles.

I claim:

1. An enclosed measuring device for measuring the relative position of two objects which are movable relative to each other, comprising a housing connected to one of the objects, the housing defining at least one slot extending in the direction of movement of the two objects relative to each other, a pair of flexible cover members attached to the housing so as to cover the slot and extending in the direction of the slot, the cover members being comb-shaped in transverse cross-section, the cover members being arranged in meshed contact with each other, such that a labyrinth-type line of contact between the cover members is formed, a carrying member having first and second ends, the first end of the carrying member being attached to the other one of the objects, the second end of the carrying member being connected to a structural measuring unit located within the housing, the carrying member having a meander-like shape conforming to the labyrinth-type line of contact between the two cover members.

2. The measuring device according to claim 1, wherein the housing is a hollow section and defines a chamber for receiving the cover members.

3. The measuring device according to claim 1, wherein the carrying member is formed by two adjacent pieces, a flexible printed circuit being placed between the pieces.

4. The measuring device according to claim 1, wherein the cover members are of a material having a high natural elasticity.

5. The measuring device according to claim 1, wherein the cover members are made of a material having a low natural elasticity, the cover members being attached to the housing with initial tension.

* * * * *